United States Patent Office 3,213,110
Patented Oct. 19, 1965

3,213,110
SODIUM DECABORANE DIOXANE ADDUCT
AND ITS PREPARATION
Theodore L. Heying, Tonawanda, N.Y., assignor, by mesne assignments, to the United States of America as represented by the Secretary of the Air Force
No Drawing. Filed Jan. 13, 1959, Ser. No. 786,657
2 Claims. (Cl. 260—340.6)

This invention relates to the preparation of the new adduct, sodium decaborane dioxane, $$NaB_{10}H_{13} \cdot 2C_4H_8O_2$$

More in particular, this invention relates to the preparation of sodium decaborane dioxane by the reaction of sodium hydride with decaborane while the decaborane is dissolved in dioxane. The reaction is generally conducted at a temperature of from −60° to +40° C.

The product of this invention can be incorporated with suitable oxidizers such as ammonium perchlorate, aluminum perchlorate, ammonium nitrate, etc., to yield a solid propellant suitable for rocket power plants and other jet propelled devices. Such propellants burn with high flame speeds, have high heats of combustion and are of the high specific impulse type. The sodium decaborane adduct, when incorporated with oxidizers, is capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The following example illustrates the invention.

*Example I*

A suspension of 0.45 gram (0.018 mole) sodium hydride in about 20 cc. of dioxane (freshly distilled from sodium hydride) was stirred in a 125 ml. flask while a solution of 2.0 grams (0.016 mole) of decaborane in approximately 20 ml. of dioxane was added slowly. No evidence of reaction occurred until approximately half of the material was added, then hydrogen evolution began and a voluminous yellow precipitate formed. After all of the decaborane had been added, an additional 10 ml. of dioxane was added forming a yellow slurry with continued hydrogen evolution. The solution was filtered and a large amount of yellow filter cake was obtained (no weight is available). A portion of this was dissolved in water with some bubbling. On acidification with HCl, the bubbling increased and a fine white precipitate separated. This white precipitate was filtered from the solution. It was apparently decaborane since it melted at 95° to 98° C. without being recrystallized or dried. The white precipitate was soluble in petroleum ether.

A portion of the filter cake was added to Grignard ether, but little, if any dissolved. Eventually the filter cake became white.

A portion of the filter cake was dried at less than 1 mm. Hg total pressure for about one-half hour at room temperature. As excess dioxane was removed, the yellow solid became nearly white. No decaborane sublimed at room temperature. The drying was continued at 60° C. for 1 hour and for an additional 5 hours at room temperature. Again no decaborane was obtained. The solid did not melt or show any change at temperatures up to 305° C.

An elemental analysis showed that the solid contained 31.6, 31.7, 32.7 percent boron, 7.9 percent sodium, 26.5 percent carbon, 8.9 percent hydrogen and 24.0 percent oxygen. These analyses agree favorably with the theoretical elemental analysis for $NaB_{10}H_{13} \cdot 2C_4H_8O_2$, 33.7 percent boron, 7.2 percent sodium, 30.0 percent carbon, 9.0 percent hydrogen and 20.1 percent oxygen.

The compound with ethyl bromide gave a slow reaction. With $C_5H_{11}Cl$ and $(CH_3)_3CCl$, moderate reactions were obtained. The $NaB_{10}H_{13} \cdot 2C_4H_8O_2$ apparently reacted with benzene. In each of these reactions a white precipitate was formed. The original solid was soluble in benzoyl chloride.

The boron-containing solid material produced by practicing the method of this invention can be employed as an ingredient of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing sodium decaborane adduct, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde of phenol-formaldehyde type, the function of the resin being to give the propellant mechanical strength and at the same time improve its burning characteristics. Thus, in manufacturing a suitable propellant, proper proportions of finely divided oxidizer and finely divided sodium decaborane adduct can be admixed with a high solids content solution of a partially condensed urea-formaldehyde or phenol-formaldehyde resin, the proportions being such that the amount of the resin is about 5 to 10 percent by weight, based upon the weight of the oxidizer and sodium decaborane adduct. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

I claim:
1. A method for the preparation of a solid sodium decaborane dioxane adduct which comprises reacting sodium hydride with decaborane at a temperature of −40° to +60° C. while the decaborane is dissolved in dioxane so as to form a precipitate of said adduct, and thereafter recovering the said solid adduct from the reaction mixture.

2. A solid sodium decaborane dioxane adduct of the formula $NaB_{10}H_{13} \cdot 2C_4H_8O_2$, which maintains a solid state up to about 305° C. and is soluble in benzoyl chlovide.

References Cited by the Examiner

UNITED STATES PATENTS 2,993,751  7/61  Edwards et al. _____ 23—14
3,050,361  8/62  Mutterties _____ 23—14

OTHER REFERENCES

Gutz et al.: "Journal of The American Chemical Society," vol. 78, p. 3546 (1956).

MAURICE A. BRINDISI, *Primary Examiner.*

ROGER L. CAMPBELL, LEON D. ROSDOL,
*Examiners.*